June 8, 1954

R. C. EARLEY 2,680,563

HOT WATER CONTROL SYSTEM

Filed May 3 1951

INVENTOR.

Roy C. Earley

Patented June 8, 1954

2,680,563

UNITED STATES PATENT OFFICE 2,680,563

HOT WATER CONTROL SYSTEM

Roy C. Earley, Danvers, Mass., assignor to Ruggles-Klingemann Mfg. Co., Salem, Mass.

Application May 3, 1951, Serial No. 224,418

3 Claims. (Cl. 236—23)

This invention relates to improvements in hot water control systems and particularly to a system having a single heater with a main and auxiliary steam supply and two independent hot water delivery channels, pipe lines or conduits. One of said delivery channels having a relatively continuous varying flow, the other channel having a relatively interrupted variable flow. The invention includes thermostatic means in the first named channel for controlling the main steam supply and thermostatic means in the second named channel for controlling the auxiliary steam supply.

The main object of the invention is in providing means to render the last named thermostatic means inoperative to deliver auxiliary steam to the heater upon a discontinuance of flow in the last named delivery channel regardless of the temperature therein.

It will be understood that when a flow is discontinued in a hot water line that the water in the line will cool down, which will cause the thermostat to call for more steam when as a matter of fact, no hot water is required. My invention seeks to remedy this condition in providing means for rendering the thermostatic means inoperative to supply auxiliary steam when there is no flow in the line in which the thermostat is located.

My invention is particularly applicable to two temperature hot water systems, for example, hotels, hospitals, and other institutions, which require hot water for dish washing or sterilizing purposes and a lower temperature for washing or bathing purposes; consequently, this application should be considered in connection with my Patent 2,429,408 of October 21, 1947, which provides for such two temperature system.

A clear conception of the embodiment of the invention may be had by referring to the drawings accompanying and forming part of this specification in which like reference characters designate the same or similar parts in the several views.

Figure 1:
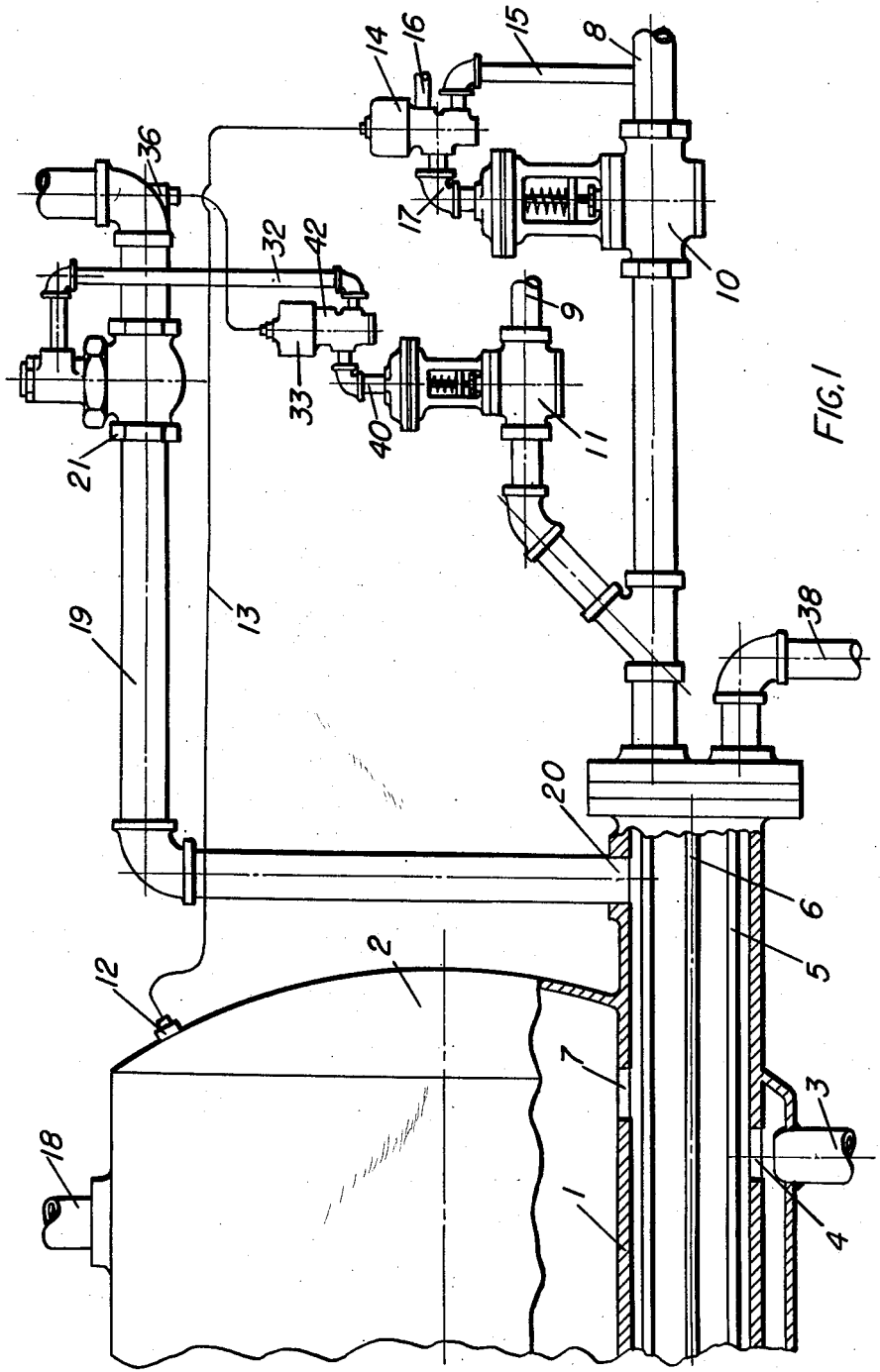
Fig. 1 represents a combination of a storage tank and heat exchanger, generally referred to as an instantaneous heater, together with the control equipment embodying my invention. The arrangement as far as the heater is concerned being shown in greater detail in my Patent Number 2,429,408, of October 21, 1947.

Referring to Fig. 1 an instantaneous heater having a shell 1 extends into a storage tank 2, a cold water inlet nozzle 3 extends through the shell of the storage tank 2 in line with an aperture 4 in the shell 1 of the heater. Return bend steam heating coils 5 extend into the shell 1 of the heater, the upper and lower extensions of which are separated by a baffle plate 6. The flow of water through the heater is countercurrent to that of the steam in the heating coils. Hot water enters the tank through aperture 7. Steam to the heating coils is supplied from two sources, namely main line 8 and auxiliary line 9. Both of these steam lines are equipped with thermostatically operated control valves, the main line at 10 and auxiliary line at 11. A condensate drip connection 38 leads to steam trap not shown.

The main line steam valve is controlled from the temperature of the water in tank 2 by means of thermostatic bulb 12, capillary tube 13 and thermostatically operated pilot valve 14. The main line control valve 10 is actuated by steam pressure controlled by thermostatic valve 14. This connection being made to main line 8 by intake pipe 15 with exhaust at 16 and delivery at 17. The mode of operation will be explained in connection with description of Fig. 2. The hot water delivery connection from storage tank is at 18. An independent hot water delivery pipe 19 connects at 20 with the heater shell 1. The object of the two delivery connections is to be able to draw water from the heater at two different temperatures. Two-temperature control systems are quite frequently required, for example, in hotels, hospitals and other institutions, the colder water supply of say 120 to 130 degrees being required for wash basins, baths and showers, while a hotter supply of the order of 160 degrees or higher is required for dish-washing machines, and other intermittent service. This difference in temperature is accomplished by drawing the last named supply from a point in the heater where the temperature of the water is the hottest. It will be understood, however, that this last named supply is for only short intervals of time and that unless some means is provided to correct this condition, the auxiliary steam supply will remain on the heater during the period that no hot water is required. This is due to the cooling down of the water at the point where the thermostat is located, there being no flow in this line. My invention, therefore, provides such novel means as is required to overcome this difficulty which will now be explained in reference to Fig. 2.

Figure 2:
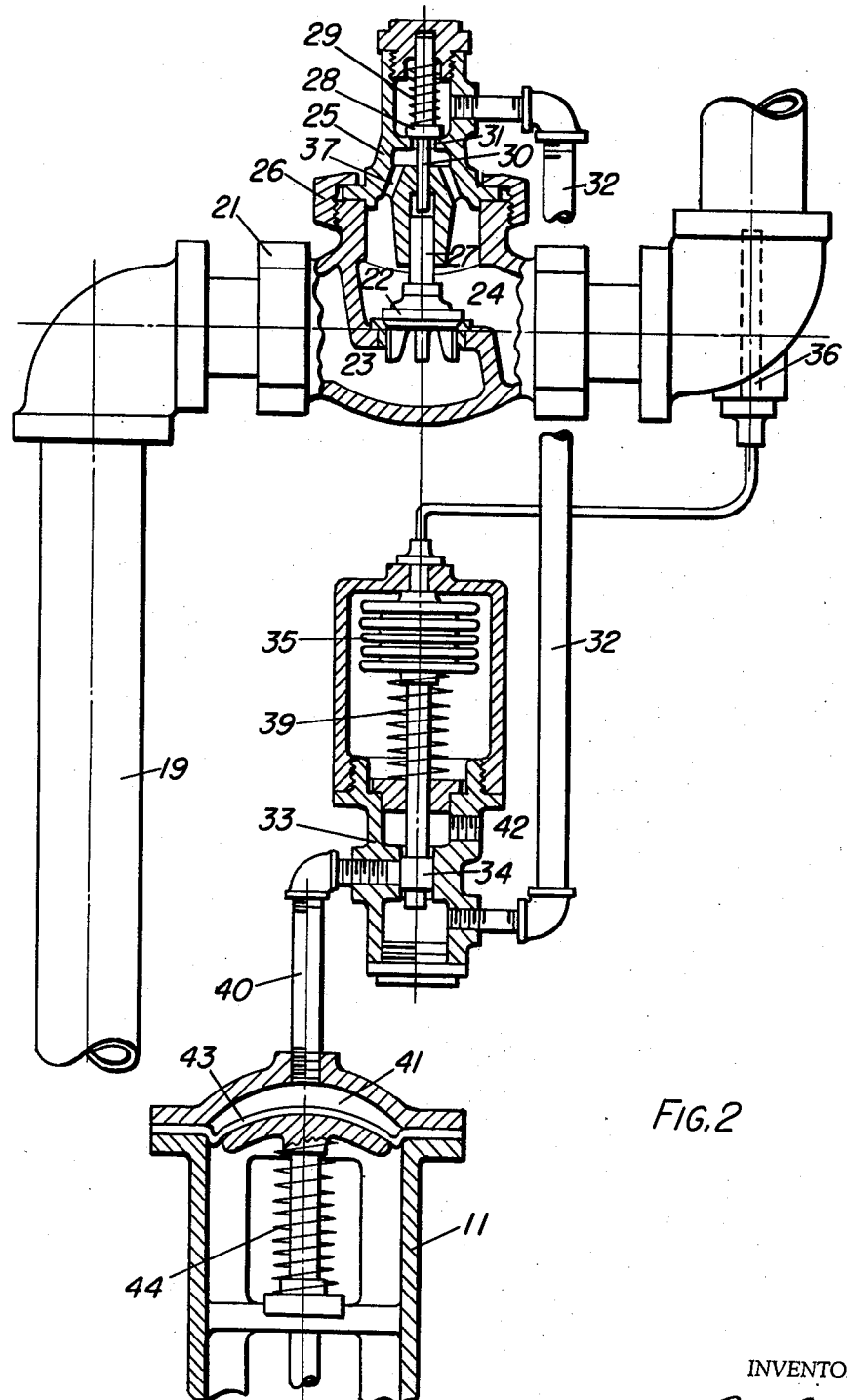
Fig. 2 represents in detail my invention, as shown schematically in the connected combination in Fig. 1.

In Fig. 2 a flow valve 21, represented here as a check valve, has an inner valve 22 which is normally closed when there is no flow in line 19. The inlet being at 23 and outlet at 24. A valve bonnet 25 is secured to the valve body 21 by means of union nut 26. Inner valve 22 has a valve stem 27 guided in the lower end of valve bonnet 25. In the upper end of bonnet 25 a relief valve 28 held to its seat against the pressure in line 29 by means of spring 29. Relief valve 28 has a stem 30 extending downward through orifice 31 the lower end of which is engaged by inner valve stem 27 when there is a flow in pipe 19 sufficient to lift inner valve 22.

A small pipe line 32 connects to a chamber above relief valve 28 and extends to a chamber at the lower end of thermostatically operated pilot valve 33. This thermostatically operated pilot valve is of the conventional type having a sliding valve 34 which is controlled to admit and exhaust fluid pressure to operate, a diaphragm operated valve 11 from the expansion and contraction of the fluid within thermostatic element 35.

In the operation of my invention, if there is no flow in line 19 inner valve 22 will remain closed, also relief valve 28 will remain closed, consequently no pressure can flow through line 32 and auxiliary steam valve 11 will remain closed, regardless of the drop in temperature at the point where the thermostatic bulb 36 is located. On the other hand, should there be a demand for hot water in this line, inner valve 22 will be forced open which in turn will force relief valve 28 open after which water under pressure can flow through ports 37, orifice 31, thence through pipe 32 to thermostatically operated pilot valve 33, thereby providing the necessary pressure in which to control auxiliary steam valve 11.

Naturally, with no flow in line 19 the temperature at 36 will be below normal requirement, due to the closing of flow operated element 22, and slide valve 34 will be forced upward by spring 39 leaving an open pressure communication between line 32 and line 40. This permits of a rapid build-up in temperature when further hot water is required and avoids excessive cold water being drawn to waste. With a demand for hot water inner valve 22 is forced open which in turn opens valve 28 allowing water under pressure to flow through ports 37, orifice 31, pipes 32 and 40, to diaphragm chamber 41. This admission of pressure to chamber 41 forces diaphragm 43 downward against spring 44 opening auxiliary steam supply valve 11 thus supplying additional steam to the heater to take care of the added requirement.

When the flow in line 19 has reached the required temperature slide valve 34 will be forced downward thus cutting off the supply of fluid pressure to diaphragm chamber 41. Should the temperature exceed the required setting then a further downward movement of slide valve 34 will vent the pressure within diaphragm chamber 41 to the atmosphere through connection 42.

It should be understood that thermostatic valve 14 is identical in construction with that of thermostatic valve 33 and the mode of operation of main steam control valve 10 is the same as the auxiliary control valve 11. It should be further understood that slide valve 34 permits pressure to leak from chamber 41 to exhaust 42 when valve 28 is closed regardless of the position of valve 34 as regulated from thermostat 36, thus slowly closing auxiliary steam valve 11.

It will be understood by those skilled in the art that I have devised a two temperature control system, which avoids the more expensive separate control systems, and more particularly in providing novel means to avoid maintaining an intermittent supply, under continuous control, when there is no demand for hot water. I therefore desire to cover all modifications, forms and embodiments within the language or scope of any one or more of the appended claims.

I claim as my invention:

1. In a hot water control system, comprising in combination, a heater for heating the water, said heater having a main steam supply and an auxiliary steam supply, independent hot water delivery channels, one of said delivery channels having a relatively continuous variable demand, the other delivery channel having an interrupted variable demand, thermostatic means in the first named channel for controlling the main steam supply, thermostatic means in the second named channel for controlling the auxiliary steam supply, a valve in the auxiliary steam line controlled thereby, motive means for operating said valve, a pilot valve adapted to control a source of fluid pressure for operating the motive means, a flow operated element in the last named channel comprising an outer casing, a partition wall separating the inlet from the outlet, an orifice in said wall, a disc element for opening and closing said orifice, a control valve operated thereby, and means due to the discontinuance of flow in the said channel to close said control valve to thereby cut off the supply of fluid pressure for operating the motive means, and rendering the thermostatic means inoperative to supply auxiliary steam to said heater.

2. In a two temperature hot water control system, comprising in combination, a heater for heating the water, a tank for storing the heated water at the required lower temperature, a main steam supply to said heater, thermostatic means for controlling said supply from the temperature of water in said tank, an auxiliary steam supply to said heater, a conduit from said heater adapted to deliver high temperature water to a source independent of said tank, thermostatic means in said conduit for controlling the auxiliary steam supply, including valve means for controlling the steam supply, motive means for operating said valve, a pilot adapted to control a source of power for operating the motive means a flow operated means in said conduit comprising an outer casing, a partition wall separating the inlet from the outlet, an orifice in said wall, a disc element for opening and closing said orifice, and means operated thereby to interrupt the supply of auxiliary power to said pilot valve upon a discontinuance of flow in said conduit to thereby render the said valve means inoperative to supply steam to said heater upon a discontinuance of flow in said conduit.

3. In a hot water control system, comprising in combination, a heater having a main steam supply and an auxiliary steam supply, independent hot water delivery channels, one of said delivery channels having a relatively continuous variable flow, the other delivery channel having a relatively interrupted variable flow, thermostatic means in the first named channel for controlling the main steam supply, thermostatic means in the second named channel for controlling the auxiliary steam supply, and means to render the last named thermostatic means inoperative to deliver auxiliary steam to said heater upon a discontinuance of flow in the last named delivery channel, said means including valve means for controlling the auxiliary steam supply, motive means for operating said valve means, a pilot valve adapted to control a source of power for operating the motive means, and a flow operated element comprising an outer casing, a partition wall separating the inlet from the outlet, an orifice in said wall, a disc element for opening and closing said orifice and means operated thereby adapted to interrupt said supply of auxiliary power to the pilot valve to thereby render the said valve means inoperative to supply steam to said heater upon a discontinuance of flow in said channel.

References Cited in the file of this patent

UNITED STATES PATENTS

| Number | Name | Date |
| --- | --- | --- |
| 1,231,822 | Warman | July 3, 1917 |
| 2,217,640 | Junkins | Oct. 8, 1940 |
| 2,429,408 | Earley | Oct. 21, 1947 |
| 2,572,253 | Fellows | Oct. 23, 1951 |